United States Patent
Cheatham, III et al.

(10) Patent No.: US 12,387,856 B2
(45) Date of Patent: Aug. 12, 2025

(54) FUEL HANDLING SYSTEM, LAYOUT, AND PROCESS FOR NUCLEAR REACTOR

(71) Applicant: TerraPower, LLC, Bellevue, WA (US)

(72) Inventors: Jesse R. Cheatham, III, Seattle, WA (US); David L. Major, Hampstead, NC (US); Samuel J. Miller, Kirkland, WA (US); Owen Dean Nelson, Richland, WA (US); Shirly I Rodriguez Rojas, Wilmington, NC (US); John E. Truax, Bellevue, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 842 days.

(21) Appl. No.: 17/226,062

(22) Filed: Apr. 8, 2021

(65) Prior Publication Data
US 2022/0051827 A1    Feb. 17, 2022

Related U.S. Application Data

(60) Provisional application No. 63/066,783, filed on Aug. 17, 2020.

(51) Int. Cl.
*G21C 19/19*    (2006.01)
*G21C 19/07*    (2006.01)
(Continued)

(52) U.S. Cl.
CPC ............... *G21F 5/10* (2013.01); *G21C 19/07* (2013.01); *G21D 1/003* (2013.01); *G21F 5/008* (2013.01); *G21C 19/08* (2013.01); *G21C 19/19* (2013.01)

(58) Field of Classification Search
CPC ........ G21C 19/07; G21C 19/08; G21C 19/19; G21C 19/20; G21C 19/32; G21D 1/003
See application file for complete search history.

(56) References Cited

U.S. PATENT DOCUMENTS 3,206,366 A * 9/1965 Bosshard ............... G21C 19/18
                                                    976/DIG. 258
3,952,885 A * 4/1976 Schabert ............... G21C 19/32
                                                    976/DIG. 258
(Continued)

FOREIGN PATENT DOCUMENTS

FR    2276664 A1 * 1/1976
GB    1550978 A     8/1979
(Continued)

OTHER PUBLICATIONS

Chikazawa, Yoshitaka, et al. "JSFR key technology evaluation on fuel handling system." Journal of Nuclear Science and Technology 51.4 (2014): 437-447. (Year: 2014).*

(Continued)

*Primary Examiner* — Lily C Garner
(74) *Attorney, Agent, or Firm* — FisherBroyles, LLP; Jeremy P. Sanders

(57) ABSTRACT

A method of handling spent nuclear fuel assemblies immerses the spent nuclear fuel assemblies in water in a relatively short time period when compared to traditional methods. A spent nuclear fuel assembly is removed from a nuclear reactor, an inert gas is applied to the fuel assembly, moisture content in the inert gas is gradually increased as it is applied to the fuel assembly, and the fuel assembly is immersed in water. The fuel assembly is immersed relatively quickly, within about 2 hours or less, which improves safety and allows normal processing and handling equipment to care for the fuel assembly. The fuel assembly may then be loaded into a cask for long-term storage and/or disposal.

14 Claims, 10 Drawing Sheets

(51) Int. Cl.
*G21D 1/00* (2006.01)
*G21F 5/008* (2006.01)
*G21F 5/10* (2006.01)
*G21C 19/08* (2006.01)

(56) References Cited

U.S. PATENT DOCUMENTS

| | | | | |
|---|---|---|---|---|
| 3,984,345 | A * | 10/1976 | Heylen | G21C 19/32 376/310 |
| 4,366,113 | A * | 12/1982 | Gigou | G21C 19/18 376/403 |
| 8,737,559 | B2 * | 5/2014 | Singh | G21F 9/28 376/272 |
| 11,217,353 | B2 * | 1/2022 | Singh | G21F 9/28 |
| 2014/0072087 | A1 * | 3/2014 | Falcone | G21F 7/015 376/272 |
| 2016/0035444 | A1 * | 2/2016 | Singh | G21C 19/08 376/272 |

FOREIGN PATENT DOCUMENTS

| | | | |
|---|---|---|---|
| JP | S54138994 A | * | 10/1979 |
| JP | S62129795 A | | 6/1987 |
| JP | S62235596 A | * | 10/1987 |
| JP | H0638118 B2 | | 5/1994 |
| JP | H1010294 A | * | 1/1998 |
| JP | 2933951 B2 | | 8/1999 |
| JP | 2003121587 A | | 4/2003 |
| KR | 20190026515 A | | 3/2019 |
| RU | 2377673 C2 | * | 12/2009 ............ F26B 21/006 |
| RU | 2555856 C1 | * | 7/2015 |
| WO | 2022039794 A1 | | 2/2022 |

OTHER PUBLICATIONS

Borisch, R. R. Theoretical analysis of sodium removal from Fast Flux Test Facility fuel subassemblies. No. HEDL-SA-399; CONF-721065-1. Hanford Engineering Development Lab., Richland, WA (United States), 1972. (Year: 1972).*

Chikazawa et al., JSFR key technology evaluation on fuel handling system, Journal of Nuclear Science and Technology, 51:4, 437-447, Jan. 7, 2014.

PCT/US2021/026493 International Search Report and Written Opinion dated Feb. 7, 2021; 8 pages.

Furukawa Kazuo, Liquid Sodium Technology (II)—For Development of fast-breeder reactor. PP221261.

PCT/US2023/069839 International Preliminary Report on Patentability issued Mar. 1, 2025.

* cited by examiner

FUEL HANDLING SYSTEM, LAYOUT, AND PROCESS FOR NUCLEAR REACTOR

CROSS-REFERENCE TO RELATED APPLICATIONS

This application claims the benefit of U.S. Provisional Patent Application No. 63/066,783, filed Aug. 17, 2020, entitled "FUEL HANDLING SYSTEM, LAYOUT, AND PROCESS FOR NUCLEAR REACTOR," the contents of which is incorporated herein by reference in its entirety.

BACKGROUND

The field of the present disclosure is related to fuel handling systems, layouts, and processes for one or more nuclear reactors. Removing sodium from irradiated sodium fast reactor core components has historically been a bottleneck in the disposition of fuel and non-fuel sodium reactor irradiated core components.

It would be advantageous to process irradiated core components much more effectively and quickly to increase safety and efficiency.

SUMMARY

According to some embodiments, a method of storing irradiated core components includes the steps of moving an irradiated core component to a pool immersion chamber; removing, by blowing the irradiated core component with an inert gas, primary coolant from an exterior of the irradiated core component; applying moist inert gas to the irradiated core component; flooding the irradiated core component with water; and immersing the irradiated core component in a pool of water.

In some examples the step of applying moist inert gas is accomplished by gradually increasing the moisture content in the inert gas.

In some cases, the step of applying moist inert gas comprises gradually increasing the moisture content in the inert gas to 100%. The primary coolant may be sodium in some examples. The sodium may be present on the irradiated core component, and the sodium may be reacted with water.

The method may include the further step of loading the irradiated core component into a cask while immersed in the pool of water. In some cases, the method is carried out in a time period of less than about 2 hours.

In some examples, the method includes the step of flushing the irradiated core component with water while immersed in the pool of water.

According to some embodiments, a method of handling spent nuclear fuel includes removing a spent fuel assembly from an in-vessel storage system within the nuclear reactor vessel; transferring the spent fuel assembly to a pool immersion cell; reacting residual sodium on the spent fuel assembly with water; and immersing the spent fuel assembly in a pool of water.

The method may further include the step of storing the spent fuel assembly in the pool of water for long-term decay. In some cases, the method includes loading a cask with the spent fuel assembly.

In some examples, the step of loading the cask is performed within the pool of water. Optionally, the step of reacting the residual sodium is performed by passing a gas with a positive moisture content over the spent fuel assembly. In some cases, the gas is an inert gas, and may be argon.

The method may include the step of increasing the moisture content in the gas, such as up to about 100%. The increasing the moisture content may be done gradually and may stop at any suitable moisture content.

In some cases, the method includes the step of creating a passivation layer over residual sodium. The passivation layer may be created by reacting the sodium with a reactant (e.g., water) for a length of time. The passivation layer may be created by applying water to the residual sodium to create a layer of sodium hydroxide.

The method may further include the step of blowing a gas through the spent fuel assembly and measuring the flow rate of the gas through the spent fuel assembly. In some cases, the gas may be measured for inclusion of reaction products, fission products, the presence of primary coolant, or some other characteristic.

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Previous sodium removal efforts used a water vapor-inert gas followed by a water flush. The sodium wetted component was placed into a pressure vessel mating the assembly inlet to semi-gas tight receptacle. The pressure vessel was closed and inert gas flow was established. Moist steam was introduced into the gas flow inlet in a controlled fashion. Hydrogen levels in the gas stream leaving the vessel were monitored and the control input for raising the moisture level in the inert gas stream. As the sodium was reacted, the moisture level was increased until there was no hydrogen with 100 moisture levels in the gas. This process was typically carried out in a dedicated hot cell, which was designed to handle the pressure of the hydrogen build up. Furthermore, it required dedicated fuel handling equipment.

At that point, the vessel was slowly flooded and water flow was initiated using a traditional pump. The ion level in the water was monitored and swapped as necessary until water flowing through the assembly would have low levels of sodium ions. The vessel was then drained and the process system and assembly was dried. The cleaned assembly was removed from the vessel. The process time was approximately 18 to 24 hours for each assembly.

This process removed almost all sodium and sodium reaction products. Stainless steels were typically used in fuel assemblies, and it was typically deemed beneficial to achieve high cleanliness standards regarding sodium hydroxide residue, especially in areas of stress.

Figure 1:
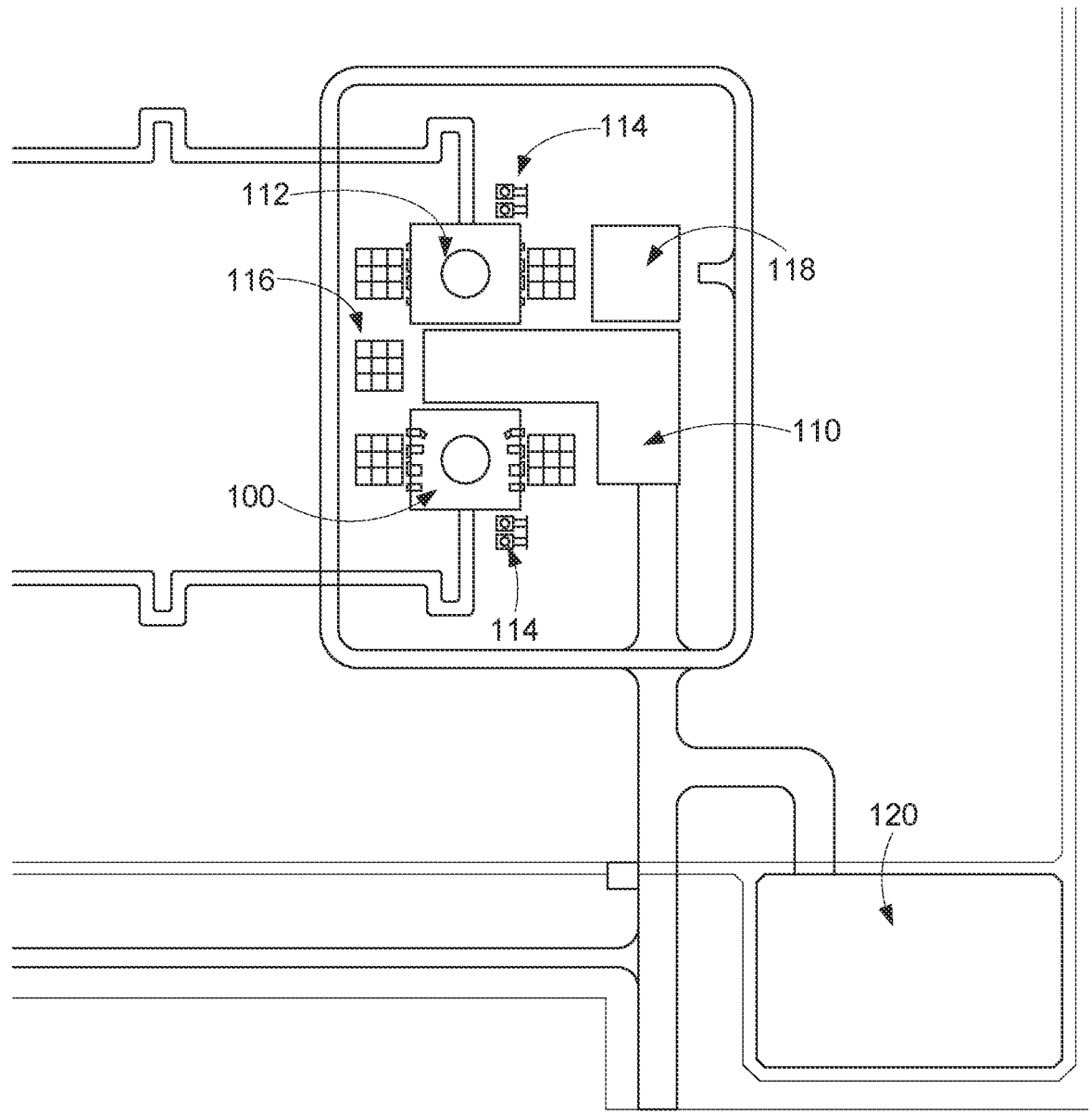
FIG. 1 is a schematic representation of a nuclear facility showing reactor buildings, and fuel handling and storage facility, according to some embodiments.
Figure 2:
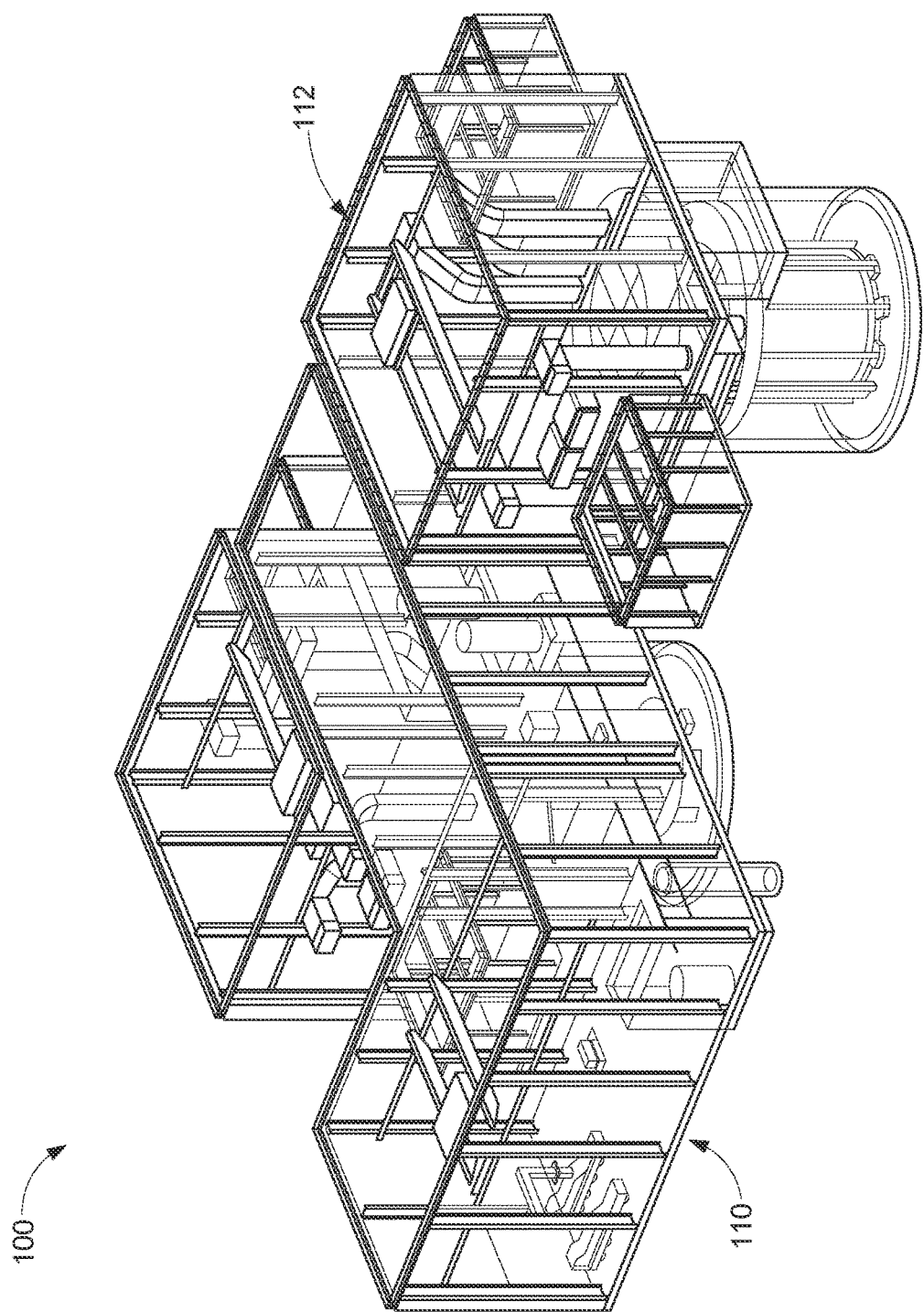
FIG. 2 is a perspective view of a schematic representation of a nuclear facility, in accordance with some embodiments.
Figure 3:
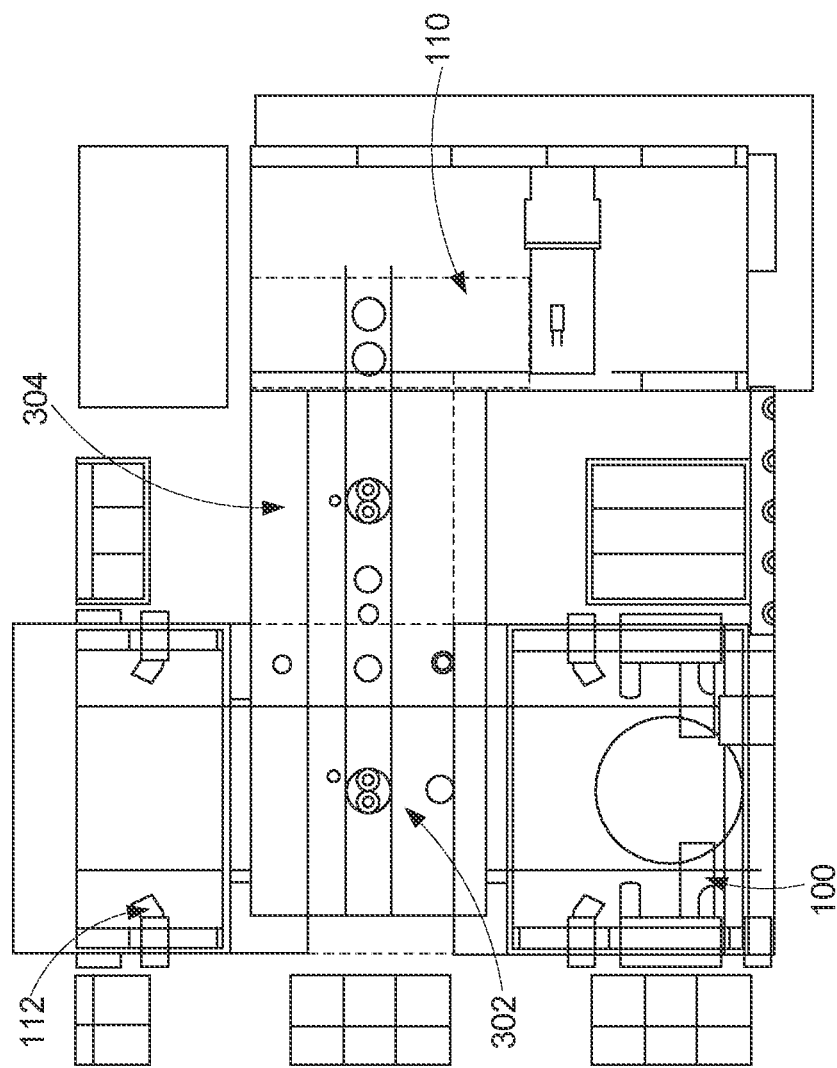
FIG. 3 is a schematic representation of a nuclear facility with multiple reactor buildings, a fuel handling and storage facility, in accordance with some embodiments.
Figure 4:
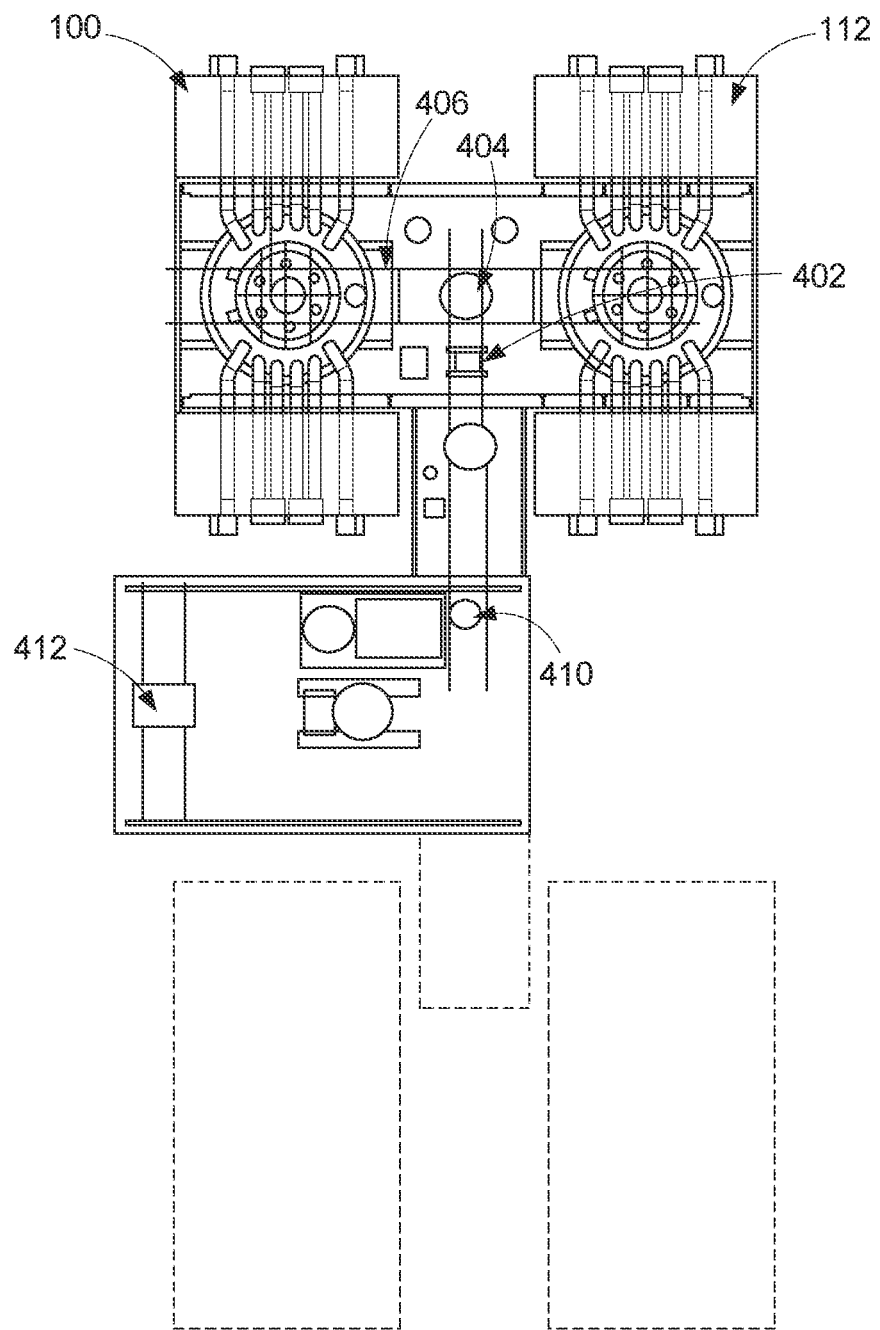
FIG. 4 is a schematic representation of a nuclear facility showing two reactor buildings and a shared refueling floor, in accordance with some embodiments.

In some cases, the buildings may be arranged as shown in FIG. 3 or FIG. 4 to allow shared refueling equipment and a larger crane envelope for reactor building (RB) maintenance and large component cask transfers that may occur in the maintenance and refueling space 302. This would allow the RB crane to set a large cask on bottom loading transfer cask rails for transfer to the FSF/Maintenance Facility 110. In some cases, a transfer hall 304 and FSF/Maintenance Building 110 may be separate structures with only the fuel service and maintenance facility having another overhead crane, while in some embodiments the transfer hall is part of the FSF/Maintenance Facility 110. According to some example embodiments, the estimated refueling and maintenance footprints are described in Table 1 below.

TABLE 1

Estimates of Refueling and Maintenance Footprint

| Area Description | 3D Model | Trade Study 2 Concept | Suggested Change from 3D model |
| --- | --- | --- | --- |
| Refueling area between reactor buildings or reactor | 26 × 19 = 494 m² | 15 × 26 = 390 m² | Reactor halls are merged with smaller common area between for refueling and maintenance. Its most important feature is the EVST |
| Refueling area from back of reactor units to FSF L-shape | 16 × 19 = 304 m² | 15 × 16 = 240 m² | Except for fuel inspection and conditioning cell. This area serves only as a transfer hall for BLTC or large casks between common reactor refueling floor and FSF and Maintenance Building |
| Main FSF and Maintenance Building Hall (Back of L portion with pool or CLS) | 40.2 × 19.4 = 780 m² | 25 × 50 = 1250 m² | Larger area specified for maintenance |
| Refueling Portion of FSF | 10 × 25 = 250 m² | 10 × 25 = 250 m² | |
| Total Refueling Footprint | 1048 m² (sum of first two and fourth row) | 880 m² (sum of first two and fourth row) | |
| Total Refueling and Maintenance Footprint | 1578 m² (sum of first three above) | 1880 m² (sum of first three above) | |

In addition, in some cases, the irradiated assemblies were sent directly to a dry storage, post irradiation examination, or reprocessing. According to many regulatory standards, the spent fuel disposal acceptance standards mandate very low levels of reactive metals.

According to some embodiments, the following describes an expedited method to get sodium wetted components into a traditional water filled spent fuel storage basin thereby greatly increasing efficiency, reducing the equipment and buildings required for handling irradiated assemblies, and reducing potential radiation exposure to facility workers and the public.

Refueling System Layout in the Reactor Building and Fuel Storage Facility

With reference to FIGS. 1, 2, 3, and 4 according to some embodiments, a general layout of a reactor building(s) 100 and Fuel Storage Facility (FSF) 110 are illustrated. In some embodiments, the plot plan has the flexibility to support up to 4 reactor units or more in a quad arrangement; however, for efficiency, only two units are illustrated for efficiency, a first reactor building 100 and a second reactor building 112.

Of course, other layouts, dimensions, configurations, number of buildings, are entirely possible within the scope of the present disclosure. Any physical sizes including dimensions, elevations, sizes, weights, etc. are provided purely for example and are not limiting on the contents of the disclosure, unless specifically recited in the appended claims.

In some cases, a residual heat removal (RHR) system 114 is provided to assist with decay heat removal and one RHR system 114 may be associated with each reactor building 100, 112. One or more control building modules 116 may be provided to monitor and/or operate the reactors within the reactor buildings. In some cases, auxiliary buildings may be provided, such as warehouse 118 space, and a remote fuel storage area 120.

In some cases, as shown in FIG. 4, a refueling system may include a central control facility monitoring high level operations of a conditioning cell, bottom loading transfer cask (BLTC) 402, Ex-Vessel Storage Tank (EVST) 404, Ex-vessel handling machine (EVHM) 406, transfer adapter, transfer station lift, In-vessel Transfer Machine (IVTM), rotating plug, pool immersion cell 410, pool cooling and cleanup system, pool core assembly handling machine 412 and other components and systems. Local refueling control points may have a plant-based data and communication network that transfers information to the central refueling control room.

In some instances, new core assemblies arrive from suppliers and are uprighted in their shipping containers in the FSF 110. A jib hoist and grapple tool may be used to transfer the vertical core assemblies to an inspection stand and on to a conditioning cell. Prior to an outage, the BLTC may be used to pick up conditioned core assemblies from the conditioning cell and transfer them to the EVST in the reactor building. In some embodiments, the EVST may be a sodium EVST, an argon EVST, or may comprise another substance, which may be inert. In some cases, during an outage, the EVHM may transfer the core assemblies between the EVST and the reactor transfer adapter. The EVHM hoist may be used to transfer core assemblies through the transfer adapter to the cover gas region where core assemblies are passed to a transfer station lift below the reactor's refueling port. The transfer station lift may move core assemblies vertically between the cover gas region and the IVTM refueling region above the top of core. In some examples, the IVTM in combination with rotating plug movements moves the core assemblies between the transfer station lift, core positions, and In-Vessel Storage (IVS) positions for decay.

According to example methods, spent fuel assemblies can be removed from IVS positions in the reactor by the IVTM and may be transferred to the transfer station lift. The transfer station lift may be used to raise fuel or non-fuel core assemblies to the cover gas region where the EVHM hoist and grapple engage the assemblies. The EVHM may then raise the core assemblies out of the reactor through the transfer adapter and into the EVHM cask on the refueling floor. Once the EVHM cask is secured, the core assemblies can be transferred to the EVST where they remain during the refueling batch transfers.

The method may include further steps, for example, following the outage, the BLTC may pick up the spent core assemblies and transfer them to the FSF to be packaged as waste or processed to spent fuel storage. In the wet cask loading method, the BLTC may transfer some, or all, of the core assemblies to a pool immersion cell where sodium is reacted, the assemblies may be immersed in water, and then may be transferred to the larger spent fuel pool. A pool handling machine may be used to move the fuel assemblies to storage racks for long term decay (e.g., 10-15 years). Some or all of the core assemblies may be eventually processed into casks within the pool such as a typical light water reactor cask loading process, as in known to those of ordinary skill in the art. The dried out, inerted, spent fuel casks may be taken to a site storage pad and waste (non-fuel) casks may be sent to long term, waste disposal sites.

Detailed Refueling Process Descriptions According to Some Embodiments:

Arrival of New Core Assemblies (Fuel, Control Rod, Shield and Reflector Assemblies)

Figure 5:
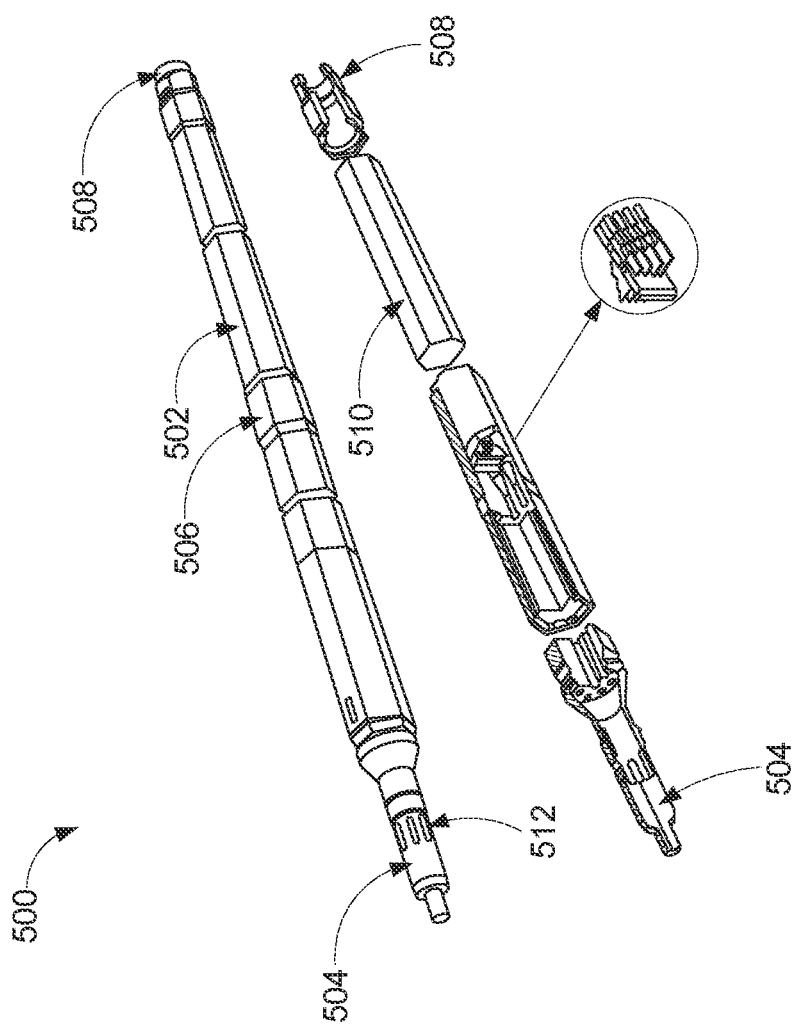
FIG. 5 is a perspective illustration of a nuclear fuel assembly, in accordance with some embodiments.

With reference to FIG. 5, which illustrates a representative example of a core assembly 500, new core assemblies may consist of driver fuel, control rods, shield, and reflector core assemblies. In some cases, the core assemblies 500 include a duct 502 that defines a nozzle assembly 504 at a first end, an above core load pad 506, and a handling socket 508 at a second end. In some cases, the core assemblies 500 may have a consistent hexagonal external configuration. Inside the core assembly 500, a fuel pin bundle assembly 510 is secured within the duct 502 and may include any suitable number of fuel pins. A series of coolant inlet ports 512 allow coolant to enter the core assembly 500 and absorb heat from the fuel pin bundle assembly 510 is the coolant flows through the duct 502.

In some cases, the core assemblies 500 arrive at the reactor site in shipping containers and each container may contain four core assemblies. The FSF overhead crane or forklift may unload the shipping containers from supplier trucks. The shipping containers may be stored in a secure area of the FSF until their inspection and conditioning is required for the outage. The shipping containers may be used for protection and security of the assemblies prior to the outage since they have the appropriate component support, vibration monitors, FME protection, and environmental controls.

During initial reactor construction an additional full core load of dummy core assemblies (e.g., core assemblies with no fuel therein) may be used to prove reactor and system critical characteristics. Depending on their design, these dummy assemblies may also be used to maintain core configuration during later refueling or maintenance activities. The dummy assemblies only require normal radioactive waste disposal controls since they have no fuel content. Specialized core assemblies with startup neutron sources may also be provided for initial reactor startup. These startup sources may be handled as fuel for their eventual disposal due to their radioactive source content. Both of these core assembly types may follow the normal core assembly handling process used for reactor refueling and disposal.

In some cases, an outage batch is sized for an 18-month cycle and is estimated to have 30 fuel assemblies and 10-15 control rods. In preparation for a refueling outage, an uprighting mechanism may bring the shipping containers to a vertical position so that core assemblies stored therein can be grappled by a top entry grapple tool. The container may be opened under strict cleanliness controls, such as to avoid contamination.

Figure 6:
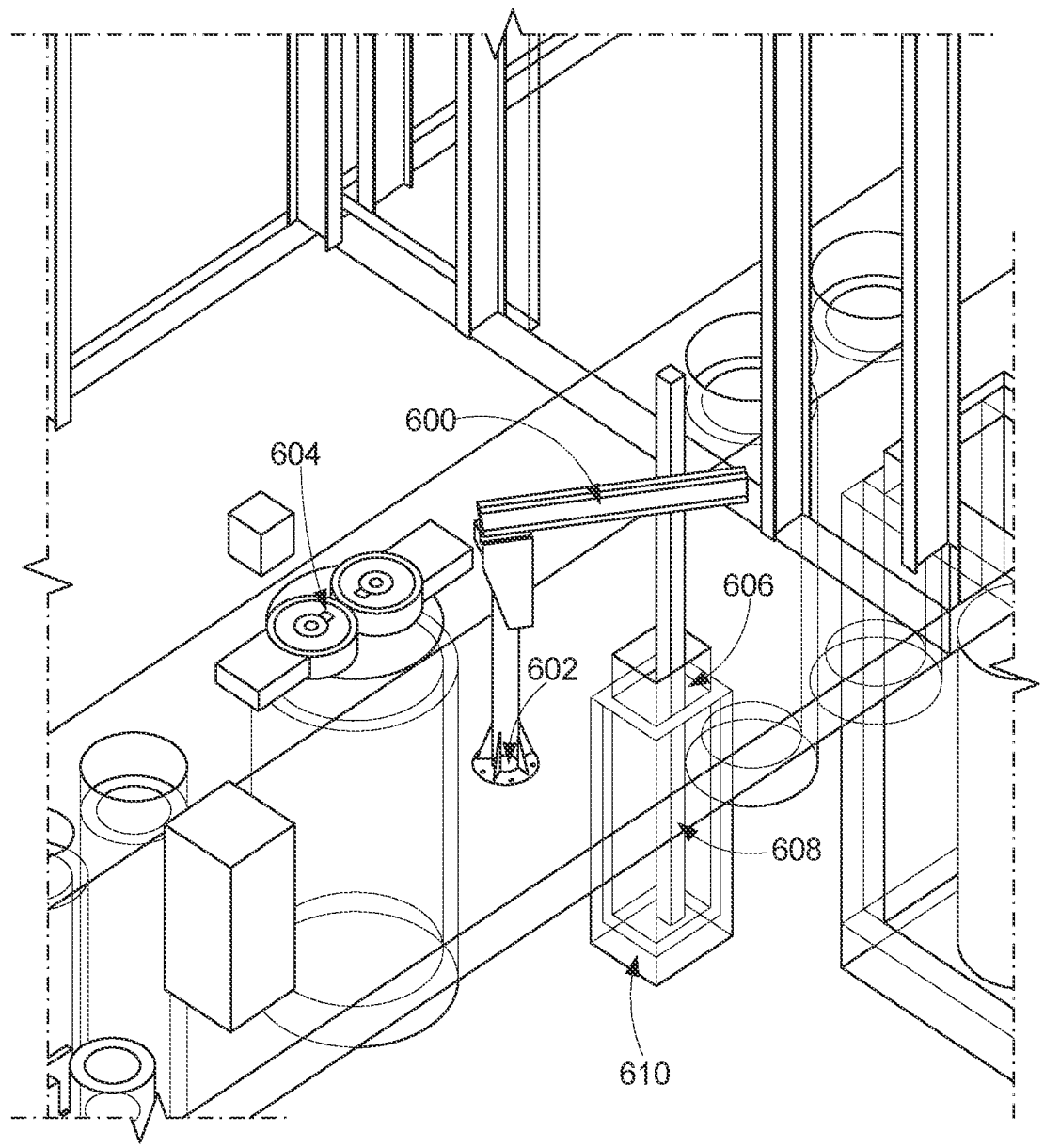
FIG. 6 is a perspective schematic illustration of a core assembly inspection stand, conditioning cell, and jib hoist, in accordance with some embodiments.

With reference to FIG. 6, a jib hoist 600 and top entry grapple tool 602 may engage each core assembly in the shipping container and transfer them to an inspection stand. In some examples, the grapple tool 602 may have about 3-4 grapple fingers that engage the handling socket 508 of the core assembly for a secure lift. FIG. 6 further illustrates a potential layout of the jib hoist 600, conditioning cell 604 and inspection stand 606. Emptied core assembly shipping containers may be returned to suppliers for future batch reloads and are not typically part of plant equipment.

In some cases, the inspection stand 606 is seismically qualified and may include a vertical elevator handling 608 two (or more) core assemblies and may be recessed into a pit 610 on the transfer hall floor near the conditioning cell 604. Once assemblies are loaded into the stand 606, the elevator 608 may raise the assemblies past operators for a full length inspection process. The assemblies may have identities recorded, may be scanned for potential shipping damage, and may be verified clean and free of foreign material. The core assembly identification may be translated to the plant's refueling database for core assembly tracking. The tracking can be maintained throughout the core assembly's service life and during disposal operations by the plant's radioactive inventory surveillance program. Flow tests may also be performed on the core assemblies in the inspection stand as a final assembly go/no-go test.

New Core Assembly Storage and Conditioning (Prior to Refueling Outage)

A clean, uncontaminated, conditioning cell may be prepared for core assemblies, such as by opening a floor valve and pulling or removing a floor access plug with the jib hoist 600 and grapple tool 602. The hoist 600 transfers the floor plug to a storage location during loading. Inspected and recorded core assemblies 500 may then be transferred into the conditioning cell 604 with the jib hoist 600 and grapple tool 602. Each core assembly 500 position in the conditioning cell may be filled by rotating a carousel to align with the floor valve opening. The valve can be closed when the carousel is filled and assemblies 500 are conditioned to refueling temperature in an inert argon environment. In some cases, the carousel capacity may be designed to hold ⅓ of a core batch (e.g., 15 assemblies in some embodiments) to allow batch conditioning with intermediate BLTC transfers to the EVST. The conditioning cell may not be intended to handle core assemblies with decay heat coming from the reactor.

According to some embodiments, the conditioning starts with a feed and bleed process that brings the initial air and moisture content of the conditioning cell to a dry and fully inert argon environment. Electric heating and circulation may then raise the argon environment to the reactor's refueling temperature of about 400 F in stepped increments. In some cases, other forms of heating may be utilized, for example, the argon gas may be passed through a heat exchanger and heat generated in the reactor core may be used to heat the argon gas. The inspection, loading, and conditioning process may be repeated until an outage batch (e.g., up to 45 core assemblies or more) have been conditioned. This process may be done in advance of the refueling outage to ensure core assemblies are fully conditioned and stored in the EVST prior to reactor shutdown. Multiple reactors using the same conditioning cell and EVST may have staggered conditioning times and outages to allow the conditioning cell and EVST to service multiple reactors.

The overhead crane may be used to install floor isolation valves and their associated adapters on the EVST. The shield plug handling cask may be mated to the floor isolation valve to pull and remove the shield plugs to provide access to the carousel for loading. The floor isolation valve may be closed and the shield plugs can be removed and stored by the crane and shield plug handling cask. The EVST may be brought to inerted refueling conditions for receipt of new core assemblies.

Example: BLTC Transfers to the EVST (Prior to Refueling Outage)

The BLTC, at refueling conditions, may mate with the conditioning cell floor valve and up to three or more core assemblies 500 may be sequentially grappled from the carousel and transferred into the cask. The BLTC continues core assembly transfers from the conditioning cell to the EVST carousel until the full refueling batch is staged for the outage. As each core assembly is placed in the EVST the tracking database is updated so all information necessary to establish the planned refueling outage sequence is verified and uploaded to refueling controls. During the outage, the EVHM may exchange new core assemblies in the EVST with spent core assemblies coming from the reactor by the established refueling sequence from the refueling control center.

In some cases, the BLTC is a rail mounted, self-supported, seismically qualified cask with a vertically translating isolation valve. The BLTC may heating and/or cooling capability to handle either new or spent fuel core assemblies. The BLTC may have centerline travel path that accesses the conditioning cell, EVST, and/or pool immersion cell through floor isolation valves.

Example: Reactor Shutdown and Outage Preparation Methodology

According to some embodiments, the reactor is prepared for refueling following a shutdown. Forced flow pumps may be secured in the reactor and natural circulation cooling brings the reactor to a refueling temperature of about 400 F according to some embodiments. The refueling temperature is provided as an example and, of course, other fueling temperatures may be applicable for other reactor types. As used herein, the terms "about" and "approximately" may, in some examples, indicate a variability of up to ±5% of an associated numerical value, e.g., a variability of up to ±2%, or up to ±1%.

The ASME boundary flange may be removed from the refueling port and the RB overhead crane main hook may move the refueling port transfer adapter from its storage location on the refueling floor to the refueling port. The transfer adapter may be installed on the refueling port followed by the associated floor isolation valve on the refueling floor. The transfer column assembly may optionally be tested, inerted, and/or heated to refueling temperature. The transfer adapter may also have cooling capability in the event that a fuel assembly becomes stuck between the cask and reactor. In some cases, the transfer adapter loading is supported by the reactor building refueling floor civil structure and not the reactor head. In some cases, the transfer adapter is shared between multiple reactors (e.g., two, three, four or more reactors) with a storage position supporting offset outage schedules.

At the EVST, transfer cask may be mated to the EVST floor isolation valve by the RB crane. The cask and floor isolation valves may be opened to access the EVST shield plug. The plug may be grappled by the cask hoist and lifted into the cask. After raising the plug, the valves may both be closed and the EVST shield plug may be taken to a storage location in the EVST carousel or to another floor structure. The floor isolation valve may now be an inert EVST boundary for refueling port plug transfer.

At the reactor, the inerted shield plug transfer cask may be mated to the transfer adapter and/or floor valve with the RB crane. The cask isolation valve and the floor isolation valve may be opened to access the reactor's refueling port plug. The plug may be grappled by the cask hoist and lifted into the cask. The valves may both be closed and the refueling port plug may be taken to the EVST plug storage positions or other location for portable glove box maintenance. The shield plug cask may also have a storage location on the RB refueling floor and, in some cases, has seismic support.

The control rod drivelines may be uncoupled from the control rod assemblies (CRAs) in the core to allow rotation of the rotating plug and IVTM for refueling. In some cases, the control rod core assemblies are disconnected with tools actuated through the control rod drive mechanism above the reactor head. Alternatively, a new CRDM design will allow remote disconnect and raising of drive lines to allow the rotating plug and IVTM motion.

The rotating plug jacks may lift the plug off of its reactor head ledge seal to allow its rotation. Power and control cables for the rotating plug and IVTM may be reconnected and the IVTM drivelines may be unlocked. The IVTM may be calibrated by position checks on up to six or more gauging locations around the perimeter of the core.

The transfer station lift, directly below the refueling port, may be cycled to confirm it raises and lowers the core assembly transfer basket from a level slightly above the reactor's sodium level down to a core assembly length above the core. The lift may be driven by a rotating shaft coming through the reactor head or refueling port with cover gas seals. In some cases, the lift translates core assemblies to an elevation where the IVTM can grapple the assemblies from the lift's side entry basket.

In some embodiments, once core assembly IVS position is verified empty, the process starts one a one refueling exchange process. The verified refueling sequence for core assembly movements may be confirmed to be in the integrated refueling control system for the EVHM, rotating plug, IVTM and EVST carousels.

Figure 7:
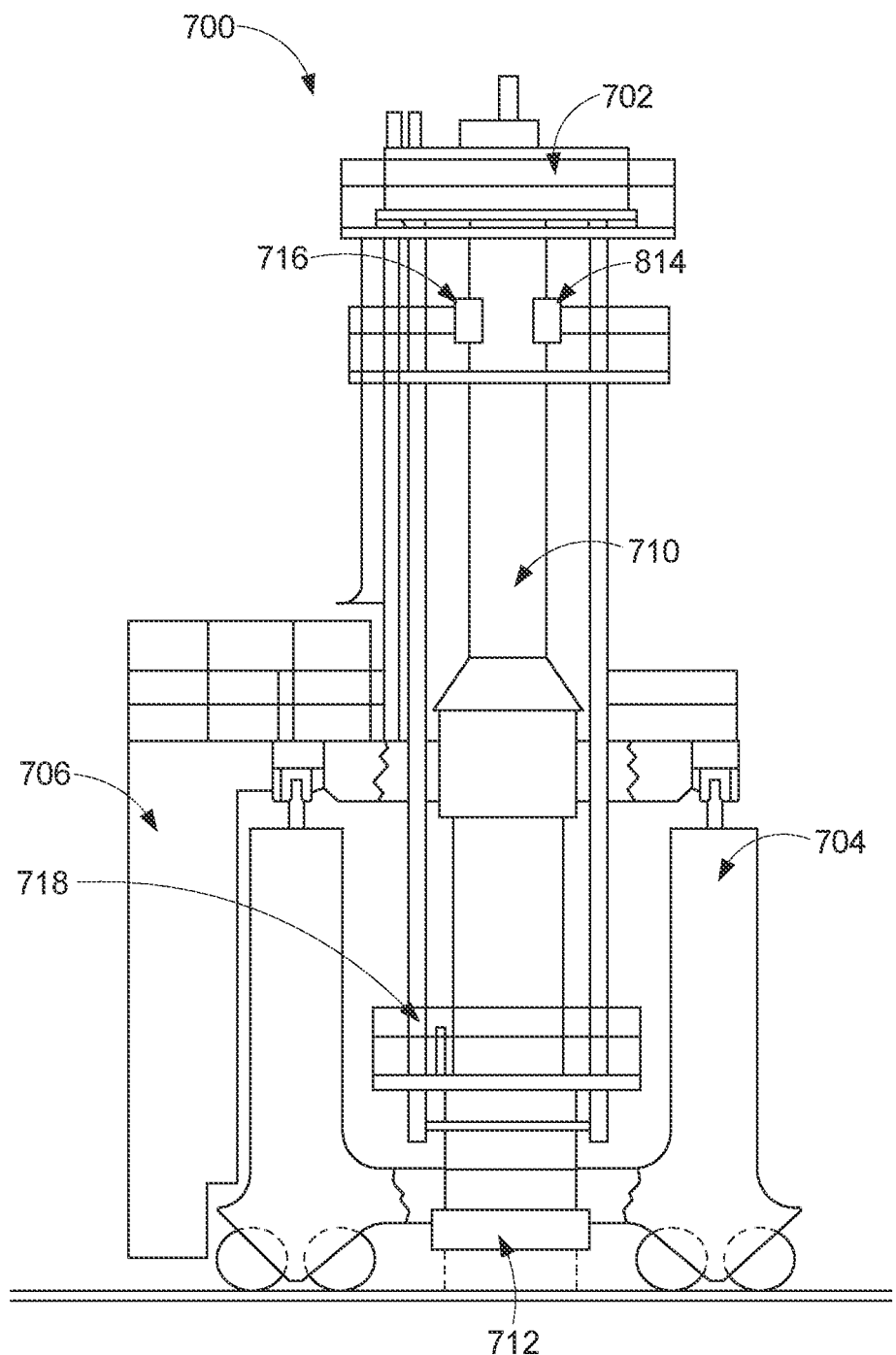
FIG. 7 is a schematic representation of a rail-mounted EVHM, in accordance with some embodiments.

Core Assembly Transfers Between EVHM, Transfer Station Lift, IVTM, Reactor Core and IVS With reference to FIG. 7, according to some embodiments, the EVHM 700 is a rail mounted, seismically qualified cask support structure for handling all core assembly transfers during an outage. The EVHM may be designed with the cask centerline travel aligned with both reactor refueling ports and the EVST access ports. In some cases, the EVHM 700 has a grapple drive system 702, a transporter 704, and a control cab 706. The control cab 706 may include controls for operating the transporter 704 and the grapple drive system 702.

The EVHM may further have a cask 710, which in some cases, is shielded. The cask may have a moveable bottom entry isolation valve 712 and may further have inerting, heating, and cooling capability for new and spent core assemblies. The EVHM 700 may further have a blower 714 and/or an air exhaust 716 for circulating air or some other gas. The EVHM cask grapple may be a universal top-entry design and may have 3-4 fingers (or more) that engage structure on the core assembly heads. The EVHM cask may have a refueling controls interface for interlocks between EVHM cask, the transfer adapter floor valve, the transfer station lift, and the EVST carousel.

In use, such as during an outage, the EVHM 700 can mate with the EVST floor valve and individually grapple and raise up to three or more core assemblies into its cask 710, which may be inerted, shielded, and/or heated. The EVST carousel may be rotated as required to select the sequenced core assembly positions for refueling. The EVST is isolated by closing the EVHM cask isolation valve and EVST floor valve. The EVHM 700 may additionally have an indexing system 818 to accept multiple core assemblies.

The EVHM 700 may move to the refueling port transfer adapter and mate with its floor valve. The transfer path into the reactor may be verified as inerted and heated to refueling conditions prior to any valve operations.

The grappled core assembly within the EVHM 700 may have its identity confirmed to match the refueling sequence. If inert refueling conditions are equal across the transfer adapter floor valve and cask isolation valve, both valves may be opened for the transfer path into the reactor. The EVHM 700 hoist may lower the core assembly from the cask down to the lift station basket in the cover gas region.

The lift station may be located in the sodium below the refueling port and may lower core assemblies through the refueling port thimble to a core assembly length above the core. The transfer station lift may have refueling control interlocks with the EVHM hoist/grapple and the IVTM. The lift station basket may have a side entry design to limit the IVTM's required vertical motion. The lift station assembly may be vertically removable through the reactor's refueling port for any necessary maintenance or replacement.

The IVTM may perform the core and IVS transfers to complete the refueling outage sequence (e.g., moves from core to IVS, IVS to transfer station lift, and transfer station lift to core). In some cases, the design of the transfer station allows the IVTM grapple head to move horizontally into the slotted thimble over the core assembly in the transfer station basket. In some cases, the IVTM grapple aligns with the core assembly's center then lowers and grapples the internal diameter. The IVTM grapple may raise vertically to unseat the core assembly head from the basket. It may then translate the grappled core assembly horizontally out of the side entry basket. This process may be repeated by the IVTM to retrieve and deposit core assemblies in the lift station basket.

The IVTM may perform the core and IVS transfers to complete the refueling outage sequence (e.g., moves from core to IVS, IVS to transfer station lift, and transfer station lift to core). The IVTM may be installed on the reactor's rotating plug and may have a horizontally traveling pantograph carrying a grapple head with telescoping features to raise and lower core assemblies. The IVTM grapple may be centered on a core, IVS, or transfer station position by rotation of the rotating plug, rotation of the IVTM, and/or extension of the pantograph. In some cases, the IVTM grapple is a top-entry design with 3-4 fingers that engage the inner diameter of the core assembly head, but can be configured with any suitable design. The IVTM grapple head also may have a rotation capability to orient the core assembly's hexagonal outline for core insertion. The reactor's UIS may have a slot that allows the IVTM to refuel the core's centerline region. The mapped core assembly locations in the reactor may be stored in the machine's computer control memory which allows refueling by an automated sequence which may be confirmed by operators. The IVTM may have refueling control interlocks with the control rod drives, the rotating plug, and/or the transfer station lift. The in-vessel portion of the IVTM may be replaceable by pulling the assembly through a transfer adapter and into a cask on the refueling floor.

According to some embodiments, to start the refueling sequence, the IVTM moves a spent core assembly from the core to an open IVS position then picks up a new core assembly from the transfer station basket and puts it into the open, sequenced, core position. The lift station may be operated to raise the head of the core assembly to a grappling height in the cover gas region. The EVHM cask isolation valve and transfer adapter floor valve may be opened, and the cask hoist may lower and grapple the core assembly from the transfer station lift basket. The core assemblies coming from IVS storage may have a decay heat less than 1.2 kw (e.g., two 18-month cycles) to be transferred in the EVHM.

The cask hoist may raise the spent core assembly into the shielded portion of the cask above the isolation valve and a sodium drip pan may rotate under the assembly to catch dripping sodium. In some cases, cask passive or active cooling features may be established to remove core assembly decay heat. The core assembly identification may be verified and/or recorded, such as by cask cameras viewing the top of the core assembly. The cask hoist may release the spent core assembly into a cask holding position for transfer to the EVST. The process may be repeated according to the refueling sequence for other core assemblies until the EVHM is filled with one or more spent fuel assemblies.

The EVHM cask isolation valve and transfer adapter isolation valve may be closed and the EVHM may be moved from the refueling port to the EVST for unloading into the carousel of the EVST. The refueling process is repeated according to the refueling sequence for all core assemblies in an outage batch, which in some cases may be 45 assemblies, but of course other embodiments may utilize any suitable number of core assemblies. In some cases, fewer than all of the core assemblies are replaced at a given time. The IVTM can perform independent in-vessel fuel, reflector, or shield shuffles or rotations in the outage sequence in parallel with EVHM movements to offload and reload core assemblies at the EVST.

EVHM Core Assembly Transfers to EVST

After the EVHM is loaded with spent core assemblies it may decouple from the refueling port floor valve and move to the EVST. The EVHM cask isolation valve may mate with the EVST floor valve and the valves may be opened. Each of the spent core assemblies in the EVHM cask may be grappled and set down in sequenced storage position of the EVST carousel. The fuel assemblies may be placed in the outer rows of the carousel for maximum decay heat removal and any non-fuel assemblies may be placed in an inner ring of the carousel. Each core assembly's storage position may be recorded and tracked by the integrated refueling system controls. The EVHM cask grapple, hoist, and isolation valve may have refueling interlocks with the EVST floor valve and carousel drive.

The EVST may be used as a short-term storage point during the refueling outage. After the outage, the BLTC may transfer core assemblies to their spent fuel processing and waste disposal cycles.

Example: BLTC Core Assembly Transfers to FSF

Following a reactor outage, the BLTC may move over the EVST and mate with the floor valve. The carousel may be rotated to the appropriate core assembly, and cask and floor isolation valves may be opened. The cask hoist and grapple may be lowered into the EVST and the core assembly may be grappled and raised into the cask. The cask may be secured by closing its isolation valve and the floor valve. The cask isolation valve may then be raised to separate the BLTC for movement on its rails. In some cases, the BLTC may have a transfer capacity equal to the EVHM, which in some cases, is up to 3 core assemblies at a time. The BLTC may be a seismically qualified rail mounted cask operating in both the reactor building and/or the FSF. The BLTC may serve multiple reactors and may support one, two, three, four, or more reactors in an expanded plot plan.

Example: Spent Fuel Pool Storage and Wet Cask Loading Method

Contrary to prior wet cask loading methods that take a long time, such as greater than two hours, or four hours, or six hours, or eight hours, or ten hours, or fifteen hours, or eighteen hours, or twenty hours, an expedited process is described for transferring irradiated core assemblies directly into a water filled spent fuel pool for long term decay and wet cask loading. FIG. 8 shows an approach for a pool immersion cell and wet cask loading. While there may be more effective processes for removing sodium, at least two primary factors justify the use of this process. First, the core assembly parts may not have materials susceptible to caustic stress cracking corrosion, and second, the core assemblies are going directly into a water pool for interim storage that has high purity and strict chemistry control. Furthermore, the described process if very efficient and significantly faster than prior processes. This form of long-term fuel storage has been licensed and demonstrated in light water reactors with high reliability.

The preparation for direct pool immersion relies on two primary factors. The first is blowing the core assembly down with inert gas either once it is removed from the reactor core, in the pool immersion cell, or both. Second, the assemblies may have a moist inert gas reaction cycle in the pool immersion cell which may be followed by a full core assembly flooding. After the flooding process, the core assembly may be transferred to the main portion of the pool for long term storage. This process significantly reduces the typical 18-24 hour time of prior processes since the assembly is not dried and inerted but instead goes directly to the pool and does not get handled again by the BLTC.

Figure 8A:
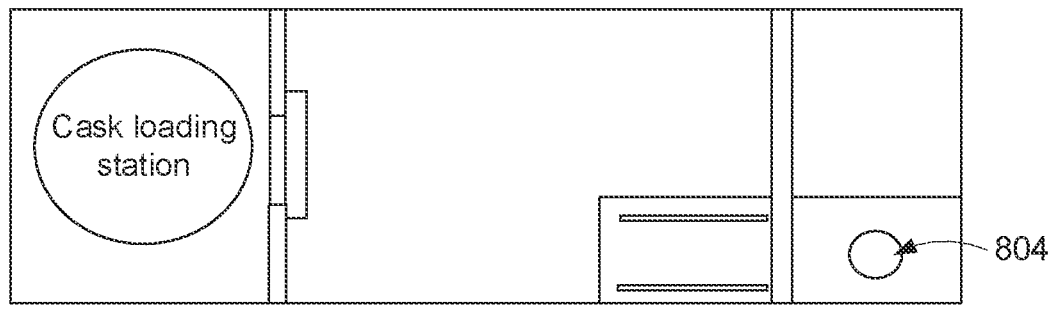
FIGS. 8A and 8B are schematic representations of a pool immersion cell from a plan view and an elevation view, respectively, in accordance with some embodiments.
Figure 8B:
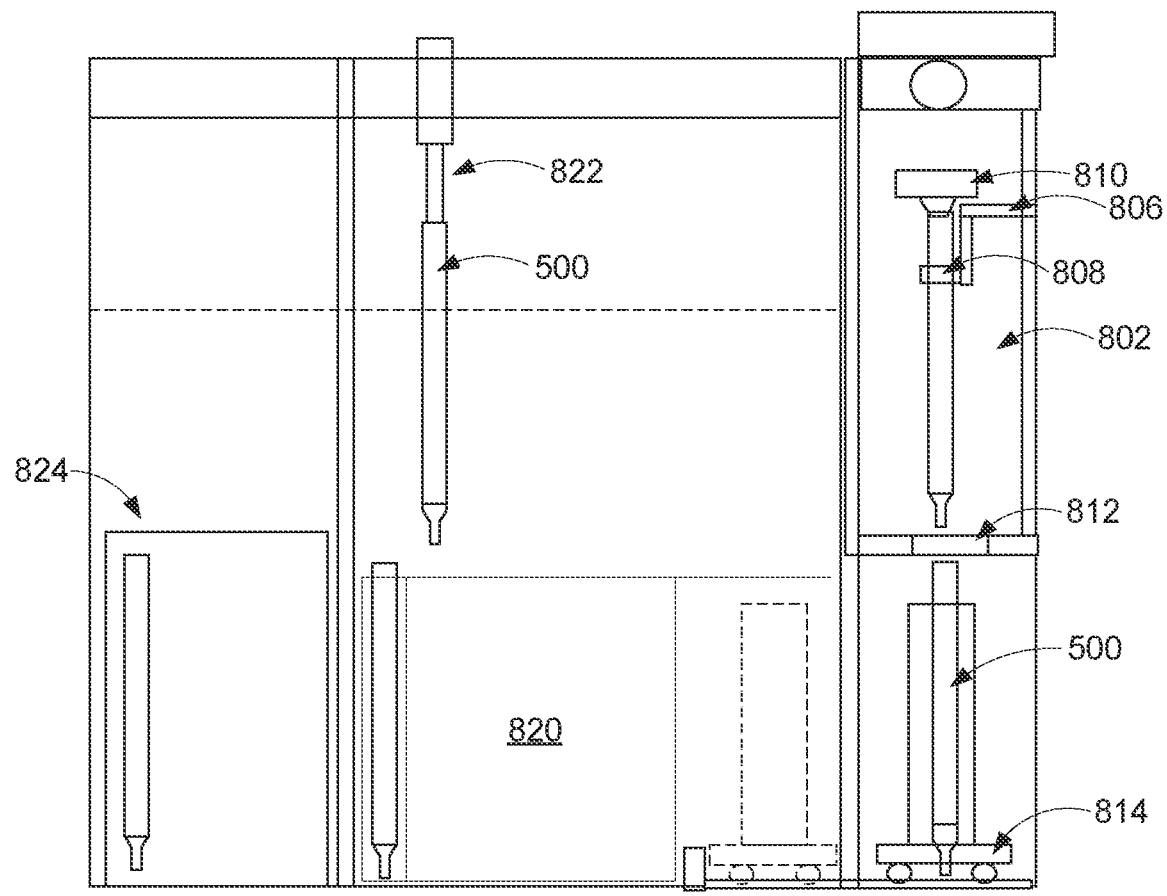
Figure 9:
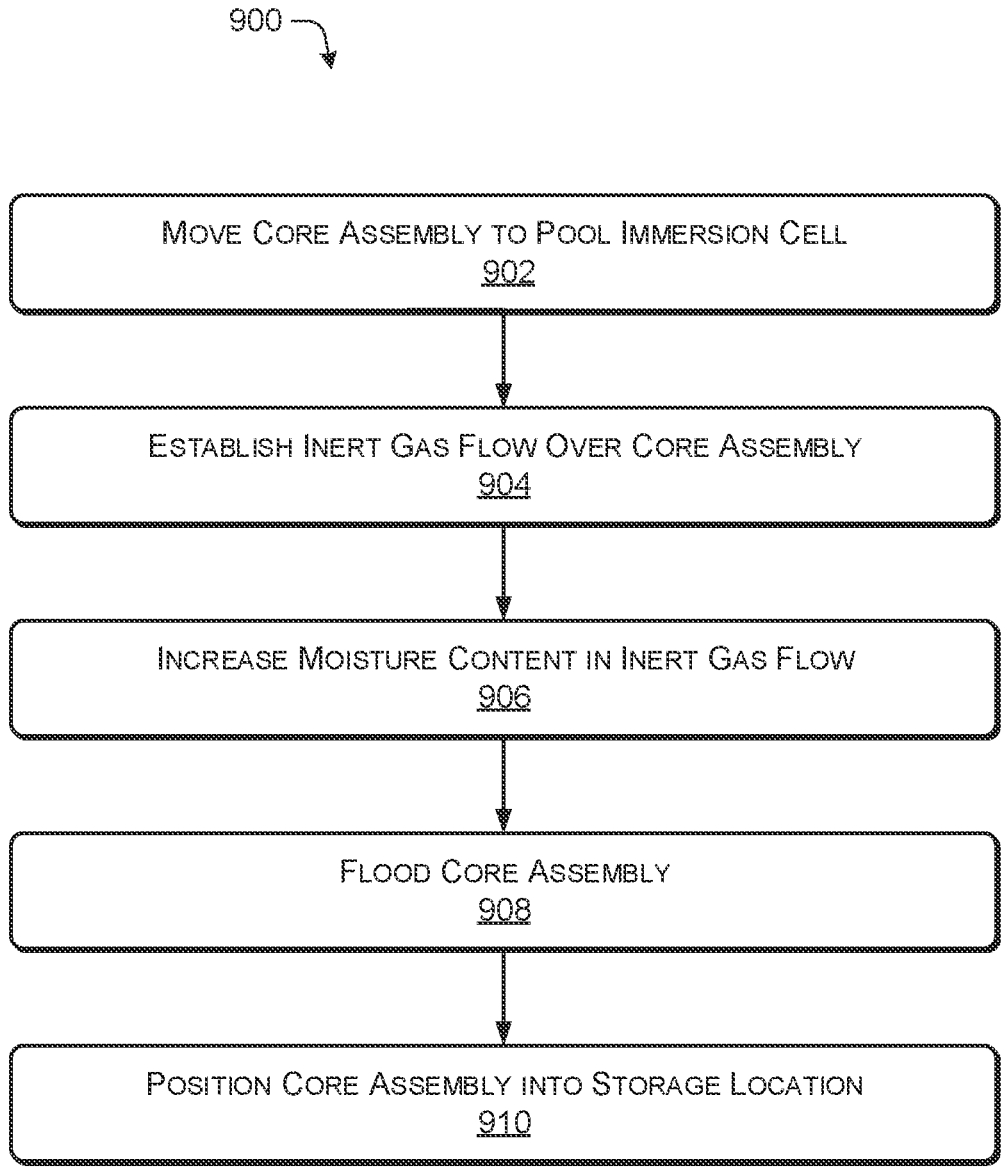
FIG. 9 is a sample process diagram for storing irradiated core assemblies, in accordance with some embodiments.

With reference to FIGS. 8A, 8B, and 9, according to some examples, the detailed pool immersion process steps 900 may include some of the following:

At block 902, the core assemblies may have been handled dry in the inert environments of the EVHM, the carousel, and the BLTC which will limit residual sodium remaining after their removal from the EVST.

The spent core assemblies may be moved, such as by the BLTC, to the initially dry, inerted, pool immersion cell 802.

The BLTC may mate with the immersion cell floor valve 804 and lower the core assembly to a core assembly elevator 806 that captures the core assembly 500, such as just under the upper handling socket with a clamping device 808.

After the load is transferred to the clamping device, the BLTC may release its grapple, raise its hoist, and the cask and floor valves may be closed.

Within the immersion cell 802, a retractable arm and nozzle 810 may move over and mate with the core assembly head and a cell vent path may be established through the immersion cell 802 to the water of the pool.

At block 904, an inert gas flow may be established through and/or over the assembly 500. Optionally, the flow of the inert gas may be measured to ensure free flowing gas through the assembly.

At block 906, moisture content in the inert gas flow stream may be incrementally increased into the gas stream to about 100% causing the residual sodium to react.

After reaching 100% moisture content, the gas and moisture flow may be stopped and the retractable arm and the nozzle assembly 810 may be withdrawn from the core assembly 500.

At block 908, a cell isolation valve 812 may open at the bottom of the cell allowing it to flood and cover the assembly 500.

The elevator 806 may then lower the core assembly 500 into a mobile trolley rack 814 on the bottom of the pool.

The elevator clamping device 808 may release the core assembly that is seated in the mobile trolley rack 814 and raise back into the cell 802.

At block 910, the mobile trolley rack 814 may move the core assembly 500 into the main pool 820 where a simple fuel handling machine 822 may grapple the assembly 500 and transfer it into a designated top-entry storage rack location.

The sodium reaction process may be repeated for the outage batch of fuel and non-fuel core assemblies.

The core assembly may continue its decay in the fuel racks for a suitable length of time (e.g., 10-15 years in some cases), cooled by the pool until it has met decay heat requirements for the wet cask loading process.

As optional steps, the overhead crane may transfer the inner cask container 824 into the cask pit for the wetted pool loading.

The simple fuel handling machine 822 may grapple the decayed core assemblies and transfer them to the submerged cask 824.

The process may be repeated to fill the inner cask 824 which may then be capped and raised to the fuel facility floor with the FSF crane.

The inner cask may be drained, dried, and/or fully inerted, such as with helium.

The FSF crane may assemble the final dry cask shielding package and place it onto the transporter The spent fuel dry casks may be taken to a site storage pad. Waste casks may be filled with non-fuel assemblies by similar or the same method and may be sent to applicable waste disposal sites.

Figure 10:
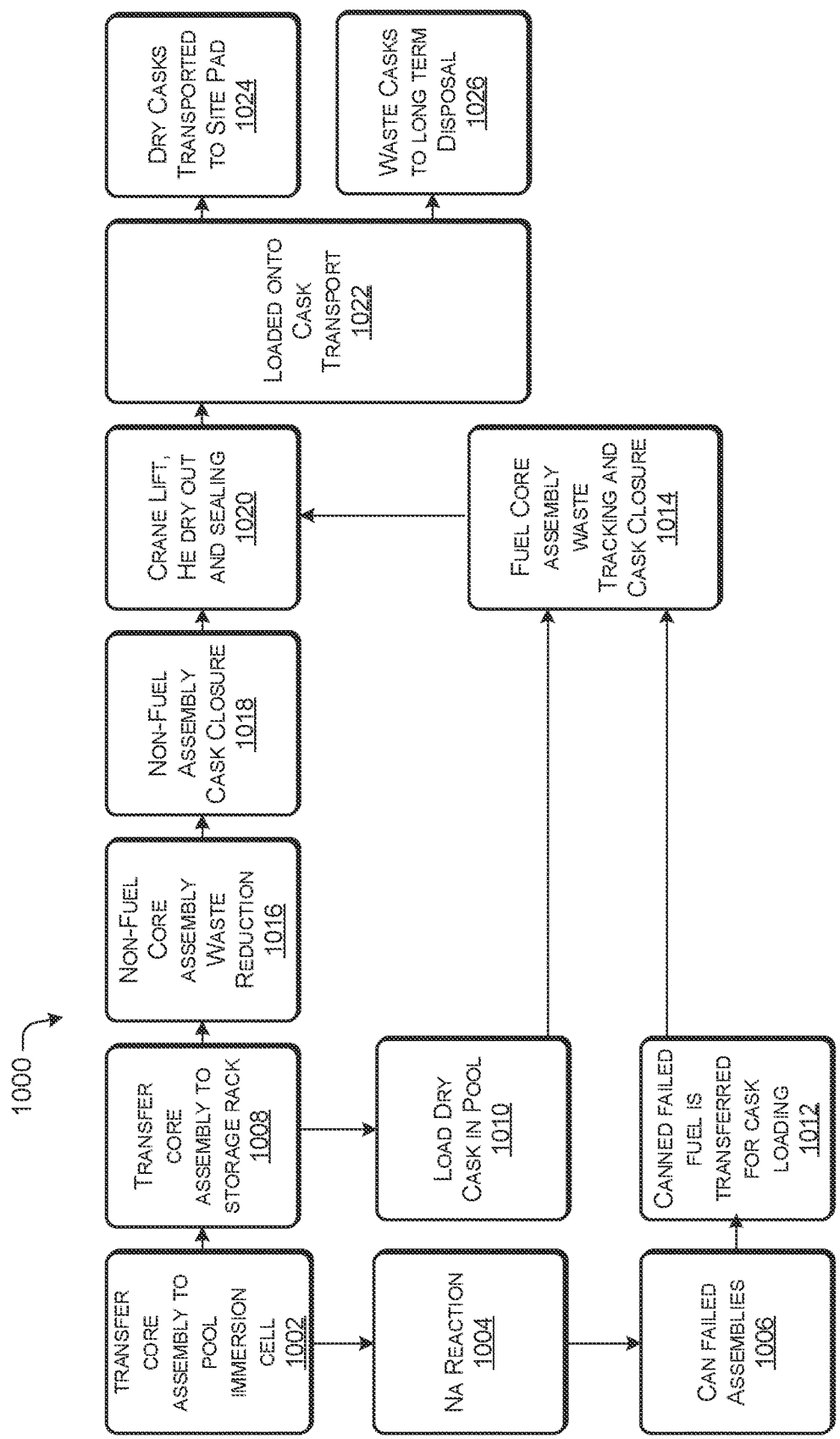
FIG. 10 is a sample process diagram for storing irradiated core assemblies, in accordance with some embodiments.

FIG. 10 illustrates a sample process flow for pool storage and wet cask loading. At block 1002, a core assembly is transferred to the pool immersion cell. In some cases, the pool immersion cell has sufficient volume such that there is little to no risk of building pressure from hydrogen production. At block 1004, the sodium is reacted, such as with water as described herein. In some cases, a gas is passed over and/or through the core assembly to firstly encourage the removal of any sodium within the core assembly. The gas may also be used for leak detection, such as by testing the gas for fission products after it has been passed through the core assembly. The moisture content in the gas may be gradually increased, such as by adding steam to the gas, in order to react with the residual sodium and create a passivation layer of sodium hydroxide to encapsulate any remaining sodium on or in the core assembly.

At block 1006, any failed assemblies are immersed in the pool and canned and secured. At block 1008, the core assemblies are immersed in the pool of water and transferred to a storage rack within the pool. This may be accomplished by using the pool handling machines.

At block 1010, a dry cask is loaded in the pool with core assemblies using the pool handling machines. In some cases, the core assemblies are loaded after about 10 years, or 12 years, or 15 years of residence time in the pool.

At block 1012, the canned failed fuel assemblies are transferred for cask loading. This may occur prior to loading the core assemblies into the cask.

At block 1014, the fuel core assembly is identified for waste tracking and cask closure. At block 1016, the non-fuel core assemblies are identified for waste tracking and reduction and transferred to waste casks in the pool.

At block 1018, the non-fuel assembly cask is closed in the pool. At block 1020, the casks (both the dry or waste casks) are lifted, dried (such as by using HE), and sealed. At block 1022, the casks are loaded onto a cask transport.

At block 1024, the dry casks are transported to site pad for storage. At block 1026, the waste casks with non-fuel are sent for long-term waste disposal.

Example: Maintenance Strategy for Infrequently Serviced, Sodium Wetted Equipment A transfer adapter may be installed by the crane between the refueling floor and reactor head/rotating plug for each piece of equipment individually removed or installed. A large opening, maintenance floor valve may be placed on top of the associated transfer adapter. The volume of the transfer adapter may be inerted, such as with argon, for the equipment transfer. A large component transfer cask may be installed on the floor valve by RB crane, fleet crane assembly, or temporary fleet cask carrier.

The piece of equipment may be hoisted into the large component cask through the transfer adapter and the cask may be handled by the RB crane, fleet crane, or fleet cask carrier for transport to a maintenance/waste handling building for offsite shipment.

Example: Failed Fuel Handling

If a failed fuel assembly (breached pins) is routed for disposal, it may be processed through the pool immersion cell and the assembly may then be canned with specialized pool tools and stored in the pool until the wet cask loading process is begun. A failed fuel assembly may have a breach in the cladding which allows communication between the inside of the fuel pin with the exterior environment. In some cases, a detection system can determine if there are fission products within the inert gas used to remove the sodium from the fuel assembly. In some cases, gamma spectroscopy may be used to detect neutrons emanating from a fuel assembly, which can be used to detect a failed fuel assembly. In some cases, the inert gas is pressurized to aid in detection of leaks.

Example FSF Additional Uses

The FSF may provide the operations floor space for new fuel receipt and all spent fuel processing. It may also provide crane and large cask floor space for all non-routine reactor maintenance to remove components such as the refueling port lift, IVTM, control rods, EM pumps, intermediate heat exchanger (IHX), and sodium traps.

Additional floorspace may also be provided for outage support or for breakdown maintenance of casks, reactor components, or radioactive decontamination operations. The floor space may also be used for mockups of critical reactor operations or training evolutions.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

A processor may be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A method of storing irradiated core components, comprising:
- moving, by a bottom loading transfer cask, an irradiated core component to a location above a pool immersion cell, the pool immersion cell at least partially below a water level in a storage pool and in selective fluid communication with the storage pool;
- transferring the irradiated core component from the bottom loading transfer cask through a floor valve and into a dry portion of the pool immersion cell;
- removing, by blowing the irradiated core component with an inert gas, primary coolant from an exterior of the irradiated core component;
- increasing a moisture content in the inert gas;
- opening a cell isolation valve in a floor of the pool immersion cell and flooding the pool immersion cell and irradiated core component through the cell isolation valve with water from the storage pool; and
- lowering the irradiated core component through the cell isolation valve in the floor of the pool immersion cell and into the storage pool, the storage pool containing a pool of water.

2. The method as in claim 1, wherein the step of increasing the moisture content in the inert gas comprises gradually increasing the moisture content in the inert gas to 100%.

3. The method as in claim 1, wherein the primary coolant is sodium.

4. The method as in claim 3, wherein sodium is present on the irradiated core component, and further comprising reacting the sodium with water.

5. The method as in claim 1, further comprising the step of loading the irradiated core component into a cask while immersed in the pool of water.

6. The method as in claim 1, wherein the method is carried out in a time period of less than about 2 hours.

7. A method of handling spent nuclear fuel, comprising the steps of:
- removing a spent fuel assembly from an in-vessel storage system within a nuclear reactor vessel;
- transferring, by a bottom loading transfer cask, the spent fuel assembly to a pool immersion cell, the pool immersion cell in selective fluid communication with a storage pool, the pool immersion cell at least partially below a water level in the storage pool;
- flowing an inert gas over the spent fuel assembly;
- increasing a moisture content of the inert gas;
- forming, with the moisture content of the inert gas, a passivation layer over the spent fuel assembly by reacting residual sodium with the moisture content of the inert gas;
- opening a floor valve in the pool immersion cell to allow water from the storage pool to flood the pool immersion cell;
- flushing the spent fuel assembly with water; and
- lowering the spent fuel assembly through the floor valve and into the storage pool.

8. The method a in claim 7, further comprising storing the spent fuel assembly in the pool of water for long-term decay.

9. The method as in claim 7, further comprising loading a cask with the spent fuel assembly.

10. The method as in claim 9, wherein the step of loading the cask is performed within the pool of water.

11. The method as in claim 7, wherein the inert gas is argon.

12. The method as in claim 7, wherein increasing the moisture content of the inert gas comprises increasing the moisture to about 100%.

13. The method as in claim 7, wherein the passivation layer is created by applying water to the residual sodium to create a layer of sodium hydroxide.

14. The method as in claim 7, further comprising the step of blowing a gas through the spent fuel assembly and measuring the flow rate of the gas through the spent fuel assembly.

* * * * *